US012106544B2

(12) United States Patent
Sun et al.

(10) Patent No.: US 12,106,544 B2
(45) Date of Patent: Oct. 1, 2024

(54) METHOD, PROGRAM, AND APPARATUS FOR MANAGING A TREE-BASED LEARNER

(71) Applicant: Telefonaktiebolaget LM Ericsson (PUBL), Stockholm (SE)

(72) Inventors: Bin Sun, Luleå (SE); Yang Zuo, Luleå (SE); Rafia Inam, Västerås (SE); Leonid Mokrushin, Uppsala (SE); Yifei Jin, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 431 days.

(21) Appl. No.: 17/434,971

(22) PCT Filed: Mar. 1, 2019

(86) PCT No.: PCT/SE2019/050180
§ 371 (c)(1),
(2) Date: Aug. 30, 2021

(87) PCT Pub. No.: WO2020/180219
PCT Pub. Date: Sep. 10, 2020

(65) Prior Publication Data
US 2022/0180623 A1 Jun. 9, 2022

(51) Int. Cl.
*G06V 10/762* (2022.01)
*G06V 10/70* (2022.01)

(52) U.S. Cl.
CPC .......... *G06V 10/7625* (2022.01); *G06V 10/87* (2022.01)

(58) Field of Classification Search
None
See application file for complete search history.

(56) References Cited

U.S. PATENT DOCUMENTS

| 2012/0323827 A1* | 12/2012 | Lakshmanan | G06F 17/18 706/12 |
| 2016/0048771 A1* | 2/2016 | Chen | G06N 20/00 706/12 |

(Continued)

FOREIGN PATENT DOCUMENTS

WO 2018 183473 A1 10/2018

OTHER PUBLICATIONS

PCT International Search Report issued for International application No. PCT/SE2019/050180—Nov. 13, 2019.

(Continued)

*Primary Examiner* — Tahmina N Ansari
(74) *Attorney, Agent, or Firm* — Baker Botts L.L.P.

(57) ABSTRACT

A method is proposed for managing a tree-based learner as following. In an initialisation phase: training the tree-based learner with a first set of specimen data to process input data with an active model chain comprising at least a root model to generate an output, each member of the first set of specimen data having a value of each of a first set of features; in an automated reconfiguration phase: receiving a new set of specimen data; performing a comparison between the new set of specimen data and the first set of specimen data; responding to the executed comparison indicating new values of a feature in the new set of specimen data, by reconfiguring the tree-based learner by the addition of a new sub-model to the active model chain, the new sub-model being trained to process at least the new values of the feature.

20 Claims, 11 Drawing Sheets

(56) References Cited

U.S. PATENT DOCUMENTS

2018/0018590 A1* 1/2018 Szeto .................... G16H 50/20
2018/0204061 A1* 7/2018 Antol ............... G06F 18/24323
2018/0373986 A1* 12/2018 Rainwater ............... G06F 11/36
2019/0026489 A1* 1/2019 Nerurkar ................ G16H 10/60
2022/0180623 A1* 6/2022 Sun .......................... G06N 5/01

OTHER PUBLICATIONS

PCT Written Opinion of The International Searching Authority issued for International application No. PCT/SE2019/050180—Nov. 13, 2019.

Noam Segev et al., Learn on Source, Refine on Target: A Model Transfer Learning Framework with Random Forests, IEEE Transactions on Pattern Analysis and Machine Intelligence, vol. 39, No. 9—Sep. 2017.

Extended European Search Report issued for Application No./Patent No. 19918173.6—1203 / 3931759 PCT/SE2019050180—Mar. 1, 2022.

Jun Won Lee et al., Transfer Learning in Decision Trees, Proceedings of International Joint Conference on Neural Networks, Orlando, Florida, USA—Aug. 12-17, 2007.

* cited by examiner

METHOD, PROGRAM, AND APPARATUS FOR MANAGING A TREE-BASED LEARNER

PRIORITY

This nonprovisional application is a U.S. National Stage Filing under 35 U.S.C. § 371 of International Patent Application Serial No. PCT/SE2019/050180 filed Mar. 1, 2019 and entitled "Method, Program, & Apparatus for Managing a Tree-Based Learner" is hereby incorporated by reference in its entirety.

TECHNICAL FIELD

The present invention is in the field of machine learning, and in particular relates to tree-based learners, and the management thereof.

BACKGROUND

In the field of using classification algorithms to make predictions and recognise objects in input data, it is often desirable to update the algorithm, for example, in response to a change in the population of classifications. Boosted model technique is one technique used for updating predictive data mining algorithms where high accuracy is needed. It is used to make a base learner more accurate by focusing more on the wrongly-predicted/regressed instances, and building a new sub-model to operate in cooperation with the existing base learner, the new sub-model being exclusively focused on processing the wrongly-predicted/regressed instances. The boosted model technique can be used for both classification and regression problems depending on which base learner is used. A common base learner is decision/regression tree. Such a base learner is widely used in image processing, object detection etc.

The core of boosting, or the boosted model technique, is the reuse of 'false-positive' and 'false-negative' data for adding new sub-models to a model. These 'false data' will happen when changing a specimen or test set which includes the new ground-truth data.

In machine learning infrastructure, data scientists work on a fixed data set and train a tree-based model to make predictions (i.e. classifications/recognitions) on the fixed data set. However, in an implementation scenario, the fixed data set may become at least partially obsolete, and it may therefore be desirable to update the model. Depending on how similar the new and obsolete data are, there is a risk that the model will be biased and stop performing as expected. In this case, a machine learning expert is required to investigate whether to add a new sub-model which replaces a root model of the tree-based model, or to reuse part of the tree-based model and add a new sub-model somewhere else in the tree-structure. This requires expertise and manual investigation into the biased samples and lots of attempts in modifying the tree structure.

During runtime, that is, when a tree-based model is executed on live query data, it is common for the features/columns of the query data to change from time to time. New features are introduced, and old ones are disappeared. Alternatively, labelling tools might change. It is also possible that the feature names are not changing, but the content and the meaning of the features are changing, or the previous features are merged into a new feature.

Conventional decision tree learning is described at https://en.wikipedia.org/wiki/Decision_tree_learning. It is desirable to provide a tree-based learner that is adaptive to changes in ground-truth data, and in particular that is adaptive to changes in ground-truth data in a manner which suppresses or eliminates a need for expert intervention. An object of the present invention is to at least partially automate the adaptation of a tree-based learner to new ground-truth data.

SUMMARY

Embodiments include a method for managing a tree-based learner, the method comprising an initialisation phase and an automated reconfiguration phase. The initialisation phase comprises training the tree-based learner with a first set of specimen data to process input data with an active model chain comprising at least a root model to generate an output, each member of the first set of specimen data having a value of each of a first set of features. The automated reconfiguration phase comprises receiving a new set of specimen data, each member of the new set of specimen data having a value of each of a new set of features, performing a comparison between the new set of specimen data and the first set of specimen data; responding to the executed comparison indicating new values of a feature in the new set of specimen data, new values being values of the feature that are outside a range of, or otherwise different from, values of the said feature in the first set of specimen data, by reconfiguring the tree-based learner by the addition of a new sub-model to the active model chain, the new sub-model being trained to process at least the new values of the feature.

Embodiments detect changes in the new specimen data as compared to the existing specimen data and decide to add a new sub-models to the active model chain, exemplary of boosted methodology. Embodiments automate a decision-making process in the management of a tree-based learner.

Advantageously, embodiments respond to changes in the specimen data by modifying the active model chain of a tree-based learner in an automated manner.

Specimen data is ground truth data, and each instance in a set of specimen data may be labelled with a classification or other target output of the tree-based learner. Specimen data may be pre-processed prior to performing the comparison and training the tree-based learner, which pre-processing may include extracting features and feature values so that the specimen data as processed in the initialisation phase and automated reconfiguration phase are feature vectors. The pre-processing may be performed by an image processing algorithm, including by a machine learning or deep learning algorithm.

Embodiments may further comprise responding to the performed comparison indicating a difference in membership of the first set of features and the new set of features, by reconfiguring the tree-based learner by building a new root model to replace a root model in the active model chain, including training the new root model with at least the new set of specimen data.

Advantageously, such embodiments are responsive to different forms of change in specimen data, so that the automated reconfiguration is tailored to the result of the comparison.

Embodiments may include, as part of the addition of the new sub-model to the active model chain, determining whether one or more sub-models adapted to process the new values of the feature is present in a database of sub-models stored in association with the tree-based learner; responding to the presence in the database of one or more sub-models adapted to process the new values of the feature by adding said one or more adapted sub-models to the active model chain of the tree-based learner as a new node or nodes; responding to the absence in the database of a sub-model adapted to process the new values of the feature by training a new sub-model adapted to process the new values of the feature, using the new set of specimen data, and adding said trained sub-model to the active model chain of the tree-based learner as a new node.

Advantageously, embodiments are responsive to implementation scenarios in which classification requirements repeat or overlap, so that sub-models that have been included in the active model chain and stored, remain available in the future. Training overheads can be reduced.

Embodiments may implement a particular technique for checking whether stored sub-models are adapted for processing the instances of specimen data having the new value of the feature. For example, determining whether a sub-model adapted to process the new values of the feature is present in the database of sub-models may comprise performing an execution of each of a set of stored sub-models on each member of the new set of specimen data including the new values of the feature, the members of the new set of specimen data being labelled with a target active model chain output value; and, for each member of the set of stored sub-models: in response to a proportion of the executions of the stored sub-model that generates an output value matching the target active model chain output value of the respective member being above a threshold proportion, determining that the stored sub-model is adapted to process the new values of the feature and adding the stored sub-model to the active model chain; and in response to said proportion being below the threshold proportion, determining that the stored sub-model is not adapted to process the new values of the feature.

Advantageously, such embodiments enable a sub-model to be selected from storage, or for it to be determined that no adapted sub-model is available in storage, without the need for manual intervention.

In the case that a sub-model is identified which meets the threshold, but still does not process all of mis-classified specimen data accurately, a further search of the storage may be carried out to find a further sub-model to add to the active model chain. For example, methods may further comprise, for each member of the set of stored sub-models: in response to a proportion of the executions of the stored sub-model generating an output value matching the target active model chain output value of the respective member of the new set of specimen data being above the threshold proportion and below unity (wherein unity in this document is 1): determining whether there is, among the set of stored sub-models, a sub-model adapted to process members of the new set of specimen data for which the output value generated by the sub-model added to the active model chain does not match the target active model chain output value; wherein, said determining includes: executing each of the set of stored sub-models on said members of the new set of specimen data for which the output value generated by the sub-model added to the active model chain does not match the target active model chain output value; and in response to any sub-model generating output values matching the target active model chain output values of more than a second threshold proportion of said members, determining that the sub-model is adapted to process said members, and adding said sub-model to the active model tree as a new node.

Embodiments compare an incoming new set of specimen data with a prevailing, or 'first', set of specimen data. Clustering algorithms may be utilised as a basis for comparison, in order to identify differences between two data sets. For example, methods may comprise performing a comparison between the new set of specimen data and the first set of specimen data comprises one or both of a first process and a second process, in the first process: executing a clustering algorithm on the first set of specimen data; executing the clustering algorithm on the new set of specimen data; and comparing the results; and in the second process: executing a clustering algorithm on the first set of specimen data and the new set of specimen data; and comparing the results.

Embodiments relate to the management or administration of a tree-based learner, which, may be, for example, a decision tree or a regression tree.

Advantageously, management of the tree-based learner may also include determining when no reconfiguration of the active model chain is necessitated by a new set of specimen data. For example, embodiments may include, in the automated reconfiguration phase: responding to the executed comparison indicating that the new set of features is the same as the first set of features, and the range of values for each of said same set of features is the same in the new set of specimen data and the first set of specimen data, by determining not to re-configure the tree-based learner at least until a further new set of specimen data is received.

Tree-based learners are actively managed by embodiments in order that they can be deployed to process live query data in an execution environment. For example, embodiments process sensor data by classifying an object or some other entity evidenced in the sensor data. For example, in embodiments, the first set of specimen data and the new set of specimen data may be sensor data output from a sensor and labelled with a corresponding target active model chain output value; and the tree-based learner, in a live execution phase following the initiation phase and running concurrently with, or being interrupted by, one or more automated reconfiguration phases, is deployed to process instances of live query data, live query data being sensor data output from a sensor in a live execution environment, and to generate a prediction as an output of the active model chain, and to label each instance of live query data with the respective prediction.

In particular, the sensor data may be data output by a camera, CCD, microphone, pressure sensor, radar, temperature sensor, 3D scanner, some other form of sensor, or a combination of the aforementioned. The tree-based learner may be adapted to the particular category of sensor data, for example, the tree-based learner may be a sound processing algorithm or acoustic processing algorithm in the case of the sensor being a microphone, a pressure data processing algorithm in the case of the sensor being a pressure sensor, an image processing algorithm or radar processing algorithm in the case of the sensor being a radar, a temperature data processing algorithm in the case of the sensor being a temperature sensor, and a 3D-geometry processing algorithm or 3D-image processing algorithm in the case of the sensor being a 3D scanner. It is further noted that for any type of sensor for which the output may be represented visually, the visual representation may be utilised as an input to the tree-based learner, and the tree-based learner be an image processing algorithm.

The tree-based learner may be an image processing algorithm, configured to recognise an object in an input image, the object being from a population of recognisable objects represented in the specimen data. Alternatively, the tree-based learner may be a sound processing algorithm, a pressure data processing algorithm, a radar processing algorithm, a temperature data processing algorithm, or a 3D-image processing algorithm, in any of the aforementioned, configured to recognise objects in the input data. For example, the first set of specimen data and the new set of specimen data may be images, the sensor being an imaging sensor, each image being labelled with one or more target detector outputs, each target detector output identifying a particular object from among a population of objects, which particular object is identifiable as an instance of the particular object in the image. Furthermore, each instance of the live query data from the execution environment may be an image, and the generated prediction with which to label the live query data is an identification of a particular object from among the population of objects, the particular object, or an instance thereof, determined by the active model chain of the tree-based learner to be identifiable in the live query data.

In a particular implementation scenario, the tree-based learner may be configured to identify electronic components, from a library of electronic components (i.e. a population), in input image data. In particular, the first set of specimen data and the new set of specimen data are images of electronic devices labelled with an identifier of the respective electronic device as the corresponding target active model chain output value, the population of objects is a population of electronic device models; the instances of live query data are images of unidentified electronic devices; and the generated prediction is an identification of the respective unidentified electronic device as an instance of a particular electronic device model from among the population of electronic device models.

Embodiments are configured to perform ongoing management of a tree-based learner, which ongoing management may include receiving plural sets of new specimen data, each superseding the previous. For example, the automated reconfiguration phase may be performed on a plurality of occasions, wherein, for each performance, the new set of specimen data includes one or more images in which an object newly-added to the population of objects since the previous performance of the automated reconfiguration phase, or, in the case of the first performance of the automated reconfiguration phase, since the initialisation phase; and on each occasion, following the automated reconfiguration phase, the new set of specimen data becomes the first set of specimen data for the next occasion.

Advantageously, embodiments enable a streamlined executable active model chain to be deployed to devices for processing live query data, whilst the more computationally intensive comparing and training processes can be executed by a server. For example, the initiation phase and one or more instances of the automated reconfiguration phase are performed by a server; and the live execution phase is performed by a device having an imaging sensor, the imaging sensor being configured to obtain the instances of live query data. The server may be a cloud server or an edge server. The device may be a terminal device.

Embodiments include an apparatus comprising: processor circuitry and memory circuitry, the memory circuitry storing processing instructions which, when executed by the processor circuitry, cause the apparatus to execute a process comprising: in an initialisation phase: training the tree-based learner with a first set of specimen data to process input data with an active model chain comprising at least a root model to generate an output, each member of the first set of specimen data having a value of each of a first set of features; in an automated reconfiguration phase: receiving a new set of specimen data, each member of the new set of specimen data having a value of each of a new set of features; performing a comparison between the new set of specimen data and the first set of specimen data; responding to the executed comparison indicating new values of a feature in the new set of specimen data, new values being values of the feature that are outside a range of, or otherwise different from, values of the said feature in the first set of specimen data, by reconfiguring the tree-based learner by the addition of a new sub-model to an active model chain, the new sub-model being trained to process at least the new values of the feature.

Embodiments include software comprising processing instructions which, when executed by computing apparatus, cause the computing apparatus to execute a method for managing a tree-based learner, the method comprising an initialisation phase and an automated reconfiguration phase. The initialisation phase comprises training the tree-based learner with a first set of specimen data to process input data with an active model chain comprising at least a root model to generate an output, each member of the first set of specimen data having a value of each of a first set of features. The automated reconfiguration phase comprises receiving a new set of specimen data, each member of the new set of specimen data having a value of each of a new set of features, performing a comparison between the new set of specimen data and the first set of specimen data;

responding to the executed comparison indicating new values of a feature in the new set of specimen data, new values being values of the feature that are outside a range of, or otherwise different from, values of the said feature in the first set of specimen data, by reconfiguring the tree-based learner by the addition of a new sub-model to an active model chain, the new sub-model being trained to process at least the new values of the feature.

The software may be a computer program. The software may be stored on a computer-readable storage medium. The computer-readable storage medium may be non-transient.

BRIEF DESCRIPTION OF THE DRAWINGS

Embodiments will now be described, purely by way of example, with reference to the accompanying drawings, in which:—

DETAILED DESCRIPTION

Figure 1:
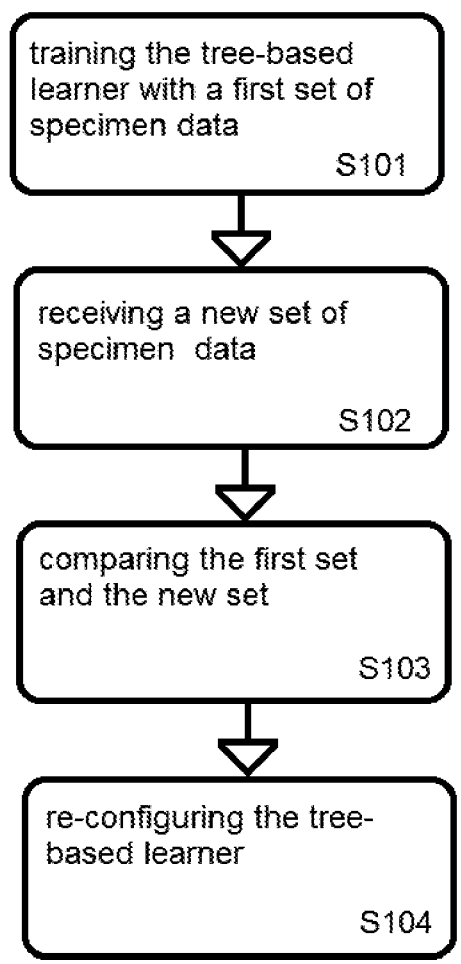
FIG. 1 illustrates a method or process of an embodiment.

FIG. 1 illustrates a method or process of an embodiment. The method may be implemented by an apparatus such as the apparatus illustrated in FIG. 2.

The method comprises steps S101 to S104, which are performed consecutively. Steps S102 to S104 may be repeated per new set of specimen data. Repetitions may be triggered by arrival of new specimen data, and may run concurrently with repetitions already being executed at the time of arrival.

Step S101 is part of an initialisation phase. Step S101 is training the tree-based learner with a first set of specimen data. Step S101 may comprise, as all or part of an initialisation phase, training the tree-based learner with a first set of specimen data to process input data with an active model chain comprising at least a root model to generate an output, each member of the first set of specimen data having a value of each of a first set of features.

The specimen data may be ground-truth data. The specimen data are instances of data adapted for input to the tree-based learner, which instances are each labelled, or otherwise associated with, respective corresponding desired or target output data of the tree-based learner. The training is a process of compiling and/or configuring an active model chain of the tree-based learner to generate output data matching the desired or target output data when processing the corresponding instance of specimen data. The tree-based learner may be a cascading classifier.

Specimen data have values of each of a first set of features. It may be that the values are explicit in an instance of specimen data, for example, being present as numeric or in some other form explicit as a value. Alternatively or additionally, the values may be implicit in the instance of specimen data, so that the tree-based learner, when executed, extracts, derives, or otherwise obtains the implicit value or values from the instance of specimen data. For example, the first set of features may be properties of objects, and the specimen data may be images of objects from which values of the property are derivable. Wherein derivable may mean extractable by a sub-model processing the instance of specimen data as input data.

The training may comprise executing a number of candidate sub-models on the specimen data and selecting a sub-model that generates output data most closely matching the desired or target output data for the first set of specimen data. The most closely matching may be measured, for example, as a number or proportion of matches, or as a distance measure between desired or target output data and output data of the candidate sub-model per-specimen-data-instance, and aggregated over the first set of specimen data.

The candidate sub-models may be stored in a sub-model database.

The sub-model generating the most closely matching output data may be selected as a root model of the active model chain.

The candidate sub-models may include configurable parameters influencing the relationship between data input to (i.e. processed by) the sub-model and output data. Said configurable parameters may be configured in the training phase, for example by a solving algorithm such as simulated annealing or grid search, in order to improve the closeness of the matching between the desired or target output data of the first set of specimen data and the data output by the candidate sub-model. Said configuring may be performed on the sub-model selected to be the root model post-selection and before being implemented as the active model chain. Alternatively or additionally, said configuring may be performed on all candidate sub-models before a selection for root model of the active model chain is made.

The tree-based learner may be a decision tree in machine learning, and may be a regression tree learner or a classification tree learner. The tree-based learner is composed of a root model and optionally also one or more additional models. The root model and additional models are sub-models. Sub-models are composed of branches, which represent conjunctions of features, leading to leaves, which represent output data, which output data may be, for example, a classification label, a continuous numeric value, or some other conclusion, description, or representation of input data. An active model chain is a root model and optionally also one or more additional models (i.e. sub-models) which process input data when the tree-based learner is executed on live query data. Live query data and specimen data being examples of input data, live query data being characterised by a desired or target output data being unknown (i.e. data for characterisation/classification/description/labelling), and specimen data being characterised by being labelled or otherwise associated with a known desired or target output.

The active model chain may be re-configured during execution of the method of FIG. 1. Sub-models may be arranged in combination in the active model chain, the combination may be of a serial nature, so that a sub-model feeds its output data to a subsequent model in the active model chain as input data, or the combination may be parallel, with plural sub-models each acting on instances of input data satisfying different input conditions (for example, a specified range of values of a feature value). Changing the sub-models in the active model chain, and the arrangement of said sub-models, is exemplary of re-configuration of the active model chain.

Following the initiation phase, the tree-based learner may be executable on live query data from an execution environment. The live query data is data coming from an execution environment. The executable tree-based learner uses the active model chain to process live query data as input data in order to generate output data. The output data, for example, is a characterisation, label, description, or some other representation of the live query data (previously unknown to a party submitting the live query data).

Steps S102 to S104 compose an automated reconfiguration phase. The automated reconfiguration phase re-configures the active model chain of the tree-based learner without manual intervention.

At step S102, a new set of specimen data is received by the tree-based learner. The receiving may comprise receiving a new set of specimen data, each member of the new set of specimen data having a value of each of a new set of features.

The new set of specimen may be submitted by a party responsible for maintenance or management of the tree-based learner. The new set of specimen data may represent a change in features when compared to the first set of specimen data, or a change in feature values, or a change in desired/target output values, or no change at all. The above description of the first set of specimen data may be applied to the new set of specimen data, noting that both the first set of specimen data and the new set of specimen data are instances of sets of specimen data. The sets are composed of instances or members, each instance or member being labelled or otherwise associated with respective target or desired output data.

The receipt may be via an interface, or it may be that the new set of specimen data is saved into a memory circuitry accessible to, or composing part of, an apparatus executing the method of FIG. 1.

At S103 a comparison is executed between the new set of specimen data and the first set of specimen data.

The comparison may be performed by executing a cluster & compare algorithm on the two sets of specimen data.

The comparison may have one of a finite set of outcomes. For example, the finite set of outcomes may include a conclusion that feature values are different across the two sets of specimen data. The finite set of outcomes may also include a conclusion that the membership of the sets of features is different across the two sets of specimen data, that is, that the identity of the features is different across the two sets. The finite set of outcomes may also include a conclusion that the specimen data across the two sets of features is the same, wherein, the same may mean that neither of the two aforementioned conclusions (different feature values, different set of features) is true.

At step S104, the tree-based learner is re-configured. The re-configuration of the tree-based learner may comprise responding to the executed comparison indicating new values of a feature in the new set of specimen data, new values being values of the feature that are outside a range of, or otherwise different from, values of the said feature in the first set of specimen data, by reconfiguring the tree-based learner by the addition of a new sub-model to an active model chain, the new sub-model being trained to process at least the new values of the feature.

The new values may be different from the values in the first set of specimen data by virtue of being outside of the range of values for the same or analogous feature in the first set of specimen data. Alternatively, it may be that the new values of the feature occupy a range shifted with respect to the range of values of the feature in the first set, or occupying only a subset of the range of values of the feature in the first set. Such alternatives are exemplary of the values being otherwise different from values of said feature in the first set of specimen data.

The new sub-model may have been previously trained and stored in a database accessible to the apparatus executing the method of FIG. 1. Alternatively, the training of a new sub-model may form part of the method. Alternatively, the two techniques may be combined, so that a sub-model adapted to process at least the new values of the feature is loaded from storage, and some training performed to further adapt the sub-model to process the new values. The new values may be the entire range of values of the feature in the new set of specimen data, or may be only those values in the new set of specimen data that are outside the range of the values of the feature in the first set of specimen data.

The new sub-model may be arranged in parallel to, or subsequent to, a root model and one or more additional sub-models in the existing active model chain.

The active model chain may be reconfigured by reconfiguring an instance of the active model chain in a memory forming part of, or accessible to, an apparatus executing the method of FIG. 1. An update script to initiate the update may be composed and distributed to one or more devices hosting versions of the active model chain. A reconfigured instance of the active model chain may be encoded, encrypted, and distributed to one or more devices.

Figure 2:
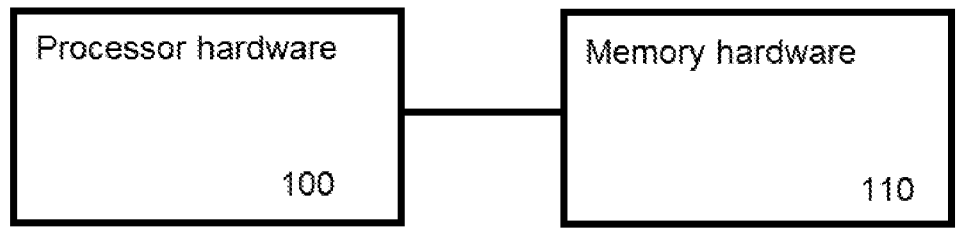
FIG. 2 illustrates an apparatus of an embodiment.

FIG. 2 is a schematic illustration of an apparatus configured to perform the method of FIG. 1. The apparatus comprises processor circuitry 100, and memory circuitry 110. The processor circuitry 100 may be, for example, processor hardware, a processor, or a plurality of interconnected processing nodes. The memory circuitry 110 may be, for example, memory hardware, a volatile memory, a non-volatile memory, or a combination of volatile and non-volatile memory. The processor circuitry 100 and memory circuitry 110 are in data communication with one another. Communication may be via one or both of a wired and a wireless interconnection.

The memory circuitry 110 stores processing instructions which, when read and executed by the processor circuitry 100, cause the processor circuitry to execute the method of an embodiment, for example, the method of FIG. 1. The memory circuitry 110 may further store a database of sub-models. The memory circuitry 110 may further store the active model chain. The memory circuitry 110 may further store the first set of specimen data.

The apparatus of FIG. 2 may be a computing device, the computing device may be a server, that is, a physical server. The physical server may provide processing functionality via one or more virtual servers.

Figure 3:
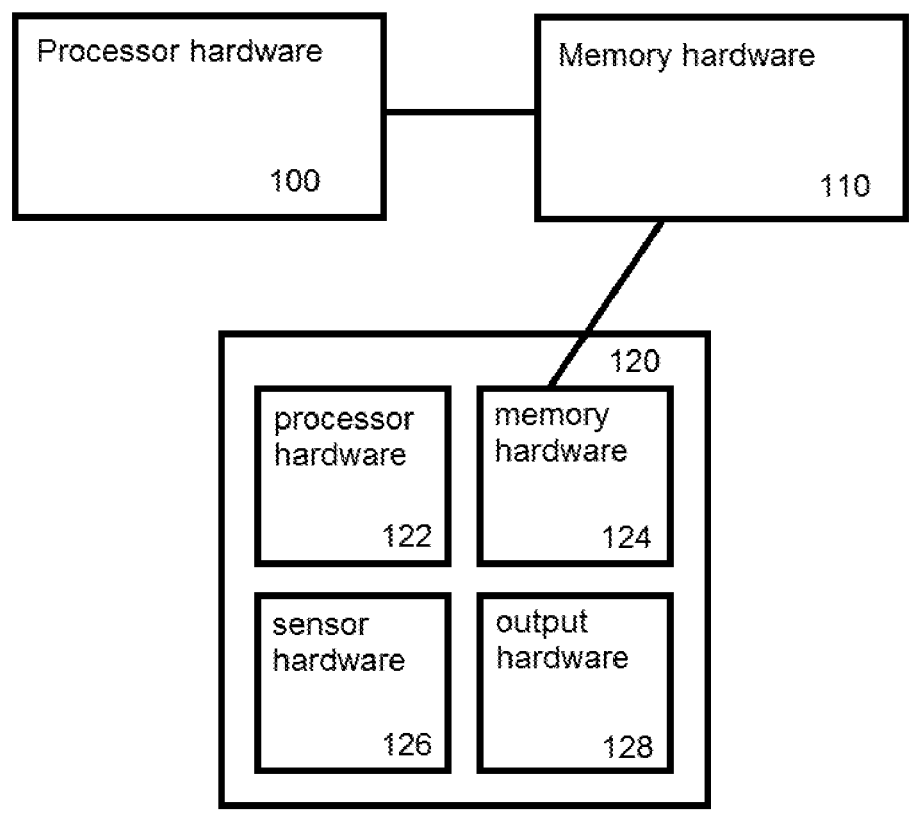
FIG. 3 illustrates an apparatus of a further embodiment.

FIG. 3 illustrates a system for performing a method of an embodiment, wherein the method further comprises a live execution phase. As in FIG. 2, the method of FIG. 1 (i.e. the initiation phase and the automated reconfiguration phase) is executed by processor circuitry 100 and memory circuitry 110. The live execution phase is executed by a terminal device 120. In the live execution phase, the active model chain is executable on live query data as input data, as discussed above.

The live execution phase may be performed by a terminal device 120. The terminal device 120 may comprise components including processor circuitry 122, memory circuitry 124, sensor circuitry 126, and output circuitry 128. The components are in data communication with one another, for example, via a bus connection, via direct connections to one another, or via the memory circuitry 124 as an intermediary.

The processor circuitry 122 may be processor hardware, and is configured to run an executable version of the active model chain on live query data, in order to generate output data. The sensor circuitry 126 is configured to obtain live query data by sensing physical properties of an execution environment, for example, by imaging the execution environment. The memory circuitry 124 may be memory hardware, and is configured to store the executable version of the active model chain, and the live query data obtained by the sensor circuitry 126. The output data generated by executing the active model chain on live input data is output by the output circuitry 128. The output circuitry 128 by be an interface with another device, or may be an audiovisual output component, such as a display unit or a speaker. The output circuitry may be configured to output the output data both via a display unit and another means, such as by writing the output data to a memory such as the memory circuitry 124.

An interconnection between the memory circuitry 110 and memory circuitry 124 is illustrated. The interconnection is not exclusive. The interconnection represents the memory circuitry 124 obtaining the reconfigured active model chain from the server following execution of the automated reconfiguration phase.

For example, the initiation phase and one or more instances of the automated reconfiguration phase are performed by a server; and the live execution phase is performed by a device having an imaging sensor, the imaging sensor being configured to obtain the instances of live query data.

In such an example, the processor circuitry 100 and memory circuitry 110 represent the server, and the terminal device 120 is the terminal device, the imaging sensor being an example of the sensor circuitry 126.

Figure 4:
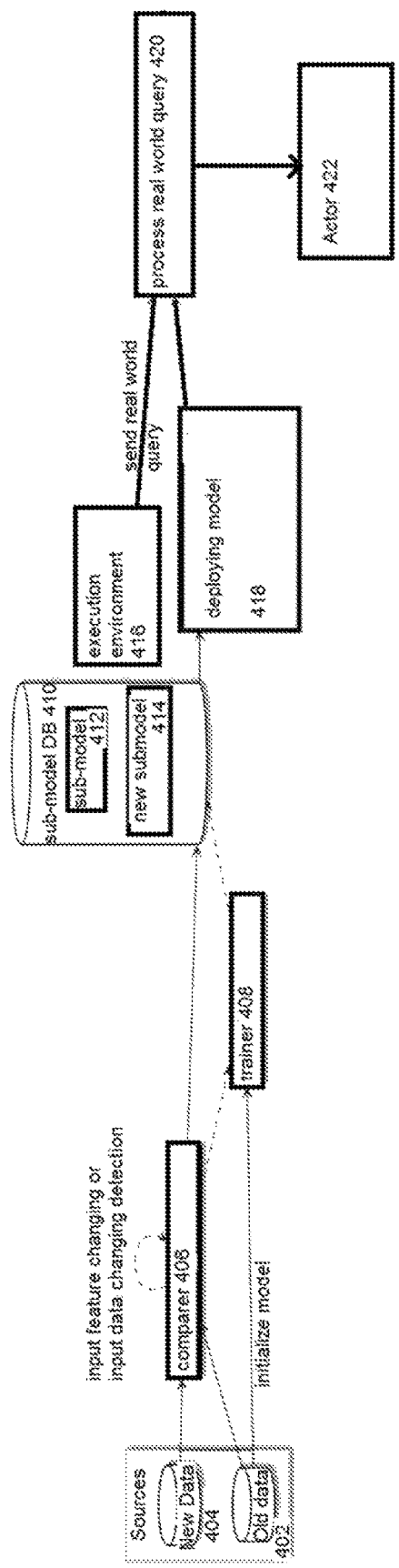
FIG. 4 illustrates a process being executed by an apparatus according to an embodiment.

FIG. 4 illustrates an apparatus executing a method of an embodiment. The comparer 406, and trainer 408 are functional components implemented by an apparatus comprising a processor circuitry and a memory circuitry, such as the apparatus illustrated in FIG. 2. The sub-model DB 410 may be stored on the memory circuitry of the apparatus, or may be stored by a separate circuitry that is accessible to the apparatus. The apparatus implementing the comparer 406 and trainer 408 may be a cloud server, an edge server, a radio base station, or some other form of network node. The apparatus implementing the active model chain in the live execution phase 420 may be a terminal device such as a computer, mobile phone, or PDA. Said terminal device being exemplary of the terminal device 120 of FIG. 3.

Figure 5:
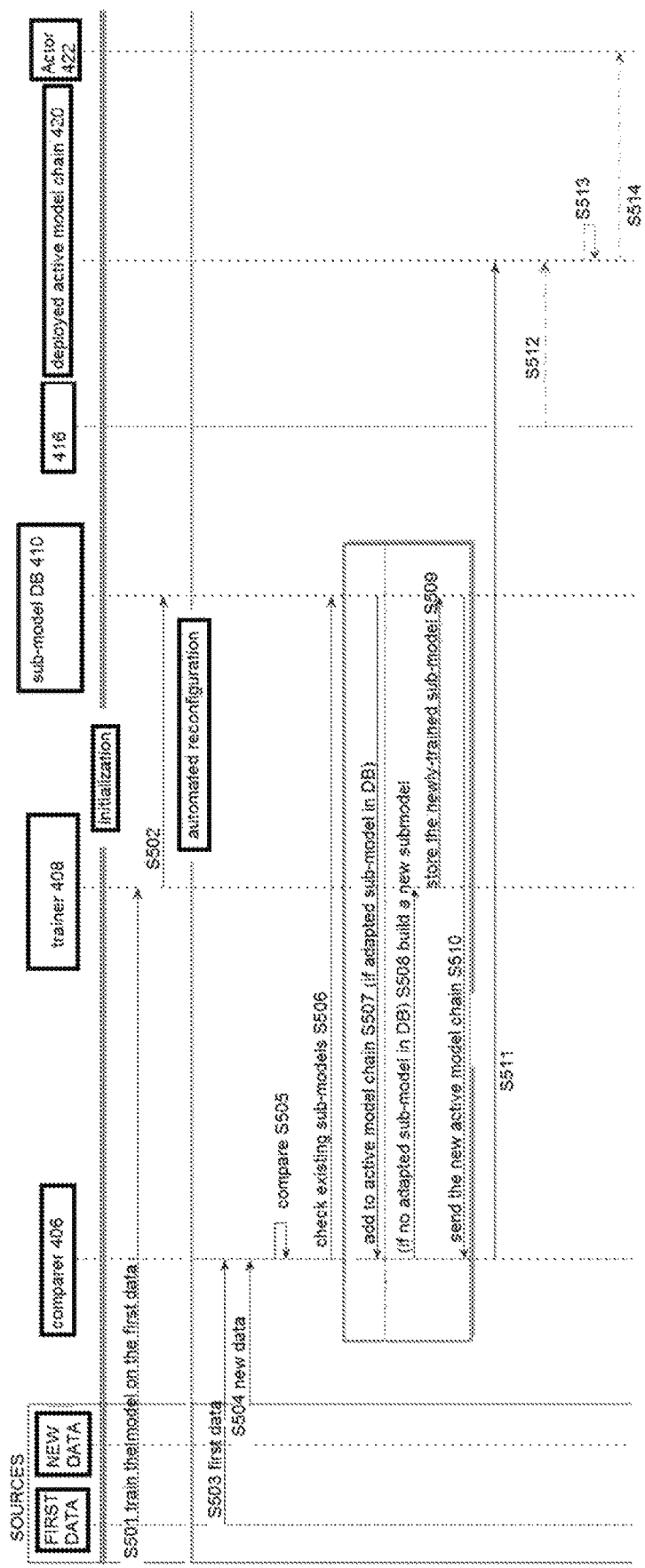
FIG. 5 illustrates in more detail the method being executed in FIG. 4.

FIG. 5 illustrates the process being executed by the apparatus of FIG. 4.

Figure 6B:
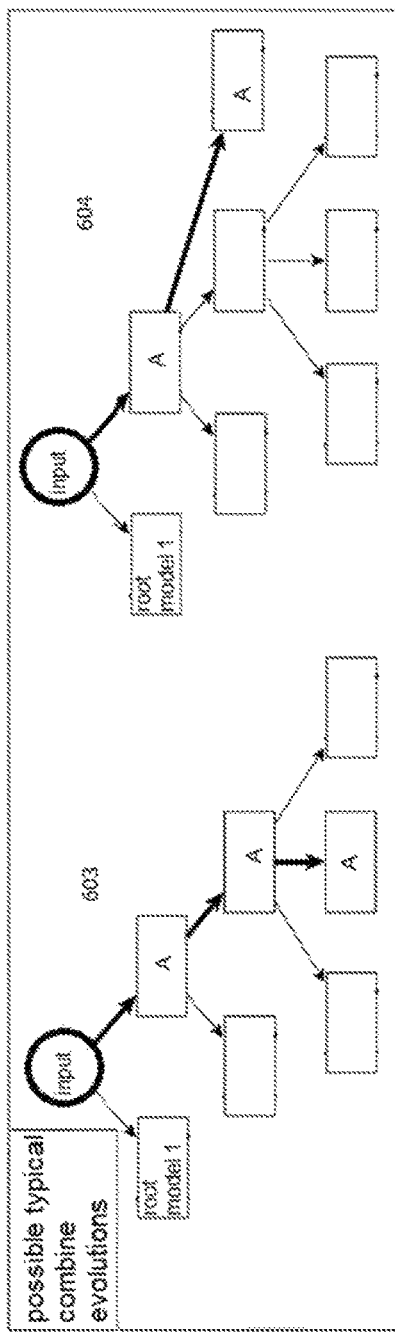
FIGS. 6A & 6B illustrate the reconfiguration of the active model chain in FIGS. 4 & 5.
Figure 6A:
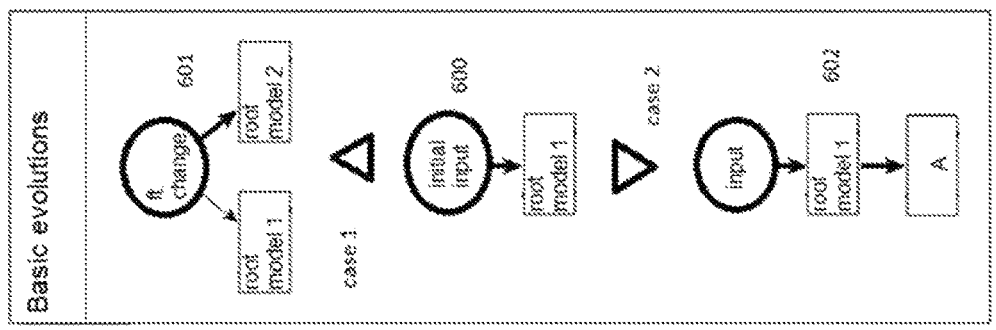

FIGS. 6A and 6B explain the automated reconfiguration of the active model chain in FIGS. 4 & 5.

The apparatus executes an initialisation phase S501, which is exemplary of step S101 of FIG. 1. In the initialisation phase, first data is obtained from a first data source 402. The first data is exemplary of the first set of specimen data, is obtained by a trainer 408 in order to train a root model of a tree-based learner. The root model may be stored in a sub-model database at S502, or otherwise retained for deployment in a deployed active model chain 420. The trainer 408 is a function provided by a processor circuitry 100 and memory circuitry 110 such as those illustrated in FIGS. 2 & 3. The trainer 408 uses the first data to train a tree-based learner, such as a classification tree learner or a regression tree learner. The classification tree learner or regression tree learner may be base learners from which the trainer 408 creates/generates the sub-models for the active model chain.

The trainer 408 is also configured, depending on the outcome of a comparison between new data (from a new data source 404) and first data by the comparer 406, and on the presence or otherwise of sub-models adapted to the new data in the sub-model database 410, to generate a new sub-model for processing the new data, or to train a sub-model recalled from the sub-model database to process the new data.

The apparatus executes an automated reconfiguration phase. The automated reconfiguration may be manually triggered, by loading or otherwise providing new data from a new data source 404 to the apparatus. The new data is exemplary of the new set of specimen data. Following triggering, there is no manual intervention in the automated reconfiguration phase. The comparer 406 receives the new data, exemplary of step S102 of FIG. 1, and compares S505 the first data with the new data, exemplary of step S103 of FIG. 1. For example, the comparer 406 may receive the first set of specimen data at step S503, and the new set of specimen data at step S504. The comparer 406 is a function provided by a processor circuitry 100 and memory circuitry 110 such as those illustrated in FIGS. 2 & 3.

The comparer 406 may execute the comparing of the two sets of specimen data by executing a data comparing algorithm, such as a cluster & compare algorithm, on the two sets of data, either one set at a time, or by combining both sets into a superset. The comparer 406 may function as a detector which detects whether the new set of specimen data is composed of features having feature values of the same range as the same or analogous features in the first set of specimen data, or whether said range has changed. Based on the presence or absence of detected changes in the ranges, the comparer 406 makes a detection that enables the apparatus to determine whether re-configuration of the active model chain of the tree-based learner is required or not, and specifically whether a new sub-model is needed in the active model chain to process live query data instantiating the new set of specimen data. The apparatus responding to the executed comparison indicating new values of a feature in the new set of specimen data, new values being values of the feature that are outside a range of, or otherwise different from, values of the said feature in the first set of specimen data, by reconfiguring the tree-based learner by the addition of a new sub-model to an active model chain, the new sub-model being trained to process at least the new values of the feature.

For example, the comparer 406 may detect changes in the data in one, two, or more ways. One way in which the comparer 406 may detect changes between the two specimen data sets is the change (adding/deleting) of features. That is, the set of features that instances of the first set of specimen data have values of, is a different set of features than that which instances of the new set of specimen data have values of. i.e. membership of the sets of features is different between the two sets. Another way is, in the case of the comparer 406 executing a cluster & compare algorithm, detecting clustering-based outlier detection for the two sets of specimen data, which requires continuous outliers and thresholds are dependent on domains. Clustering may be used to compare the new (new set of specimen data) and current (first set of specimen data or preceding new set of specimen data) data. For example, the clustering may be an unsupervised learning approach to cluster (or classify) data into clusters and find likelihood between clusters in a given dataset. For example, embodiments may use clustering-based boundary distance detection with normalization, such as is detailed in K. G. Mehrotra, C. K. Mohan, and H. Huang, "Clustering-Based Anomaly Detection Approaches," in Anomaly Detection Principles and Algorithms, K. G. Mehrotra, C. K. Mohan, and H. Huang, Eds. Cham: Springer International Publishing, 2017, pp. 41-55.

The apparatus may respond to a determination by the comparer 406 of a change in features between the two sets by responding to the performed comparison indicating a difference in membership of the first set of features and the new set of features, by reconfiguring the tree-based learner by building a new root model to replace a root model in the active model chain, including training the new root model with at least the new set of specimen data.

Each type of detection leads to a different reconfiguration of the tree-based learner. FIG. 6A illustrates the two cases. The active model chain 600 after the initialisation phase, that is, after step S101 or S501 or S502, comprises a root model 600. In the first case, case 1, there is a change of features. The apparatus responds to such a change by loading from the sub-model database 410, or creating, a new sub-model to process the new set of specimen data, which new sub-model replaces the existing root model in the active model chain as illustrated in the active model chain 601, in which the initial root model is retained in storage, but is not part of the active model chain 601. In the second case, case 2, there is a change in the values of the features, for example, a change in the range of values for one or more of the features. In the second case, a new sub-model is either loaded from the sub-model database 410, or created, and added to the active model chain as a new leaf node, as illustrated in the active model chain 602. FIG. 6B illustrates that, in case 2, there are different possible sequence chains for processing the new data by a combination of stored sub-models and the new sub-model, wherein the active model chain is indicated by the broader arrows, and the full tree (on either the right-hand or left-hand example) represents the content of the sub-model database 410. The apparatus may respond to a determination that a new sub-model is required by determining whether one or more sub-models adapted to process the new values of the feature is present in a database of sub-models stored in association with the tree-based learner, responding to the presence in the database of one or more sub-models adapted to process the new values of the feature by adding said one or more adapted sub-models to the active model chain of the tree-based learner as a new node or nodes, and responding to the absence in the database of a sub-model adapted to process the new values of the feature by training a new sub-model adapted to process the new values of the feature, using the new set of specimen data, and adding said trained sub-model to the active model chain of the tree-based learner as a new node.

In particular, the apparatus may respond to a determination that a new sub-model is required by referring S506 to a sub-model database 410. The referring includes the apparatus checking whether any stored sub-model 412 exists in the sub-model database 410 which is adapted to process the new data. If such a sub-model is determined to exist, then it is added to the active model chain at S507. It is noted that addition to the active model chain S506, and other steps including S510, in FIG. 5 is illustrated as occurring at the comparer 406. This is simply an indication that the automated reconfiguration of the tree-based learner is executed by an apparatus implementing the comparer 406, which may also be implementing other control and management functions of the tree-based learner, such as the automated reconfiguration.

For example, if a newly required sub-model sequence already exists in the sub-model database, the particular model sequence is chosen, and data is sent to corresponding deployment to be processed. Otherwise, the apparatus will train a new sub-model 414 using the trainer 408, at step S508, store the new sub-model in the sub-model database, at step S509, and include the new sub-model in the active model chain, at step S510.

Step S511 illustrates an active model chain being deployed as a predictor 420 for processing real world queries. Step S512 illustrates a real world query from the execution environment 416 being received by the deployed active model chain 420. At S513 further logic may be executed by the deployment 420 to identify any fault in the output of the active model chain processing the real world query. At S514 any suggestion resulting from the further logic is sent to an actor 422 in the execution environment 416.

For example, in checking whether any stored sub-model 412 exists in the sub-model database which is adapted to process the new data, the apparatus may test each of the stored sub-models on the new set of specimen data, and determine that a sub-model is adapted to process the new data if the sub-model generates more than a threshold number or proportion of outputs matching target outputs of the new data. For example, determining whether a sub-model adapted to process the new values of the feature is present in the database of sub-models comprises: executing each of a set of stored sub-models on each member of the new set of specimen data including the new values of the feature, the members of the new set of specimen data being labelled with a target active model chain output value; and, for each member of the set of stored sub-models: in response to a proportion of the executions of the stored sub-model generating an output value matching the target active model chain output value of the respective member of the new set of specimen data being above a threshold proportion, determining that the stored sub-model is adapted to process the new values of the feature; and in response to said proportion being below the threshold proportion, determining that the stored sub-model is not adapted to process the new values of the feature.

The sub-model database 410 may be a database that stores all sub-models that exist already or are newly created. The sub-models may be stored hierarchically as a tree structure due to the nature of tree-based learner boosting. FIG. 6B illustrates an exemplary tree structure of sub-models stored in the sub-model database 410. The active sub-models form a model-chain, referred to as an active model chain. Two trees of stored sub models are illustrated as tree 603 and tree 604. In each tree, the sub-models composing the active model chain are marked with A. It is noted that tree 603 and tree 604 are different implementations—i.e. there is only one active model chain per implementation, although the active model chain may evolve over time. For example, following new specimen data being received by the apparatus managing the tree-based learner realised by the active model chain 603, it may be determined that a new sub-model is required to process new specimen data, and the new sub-model is arranged as a leaf subsequent to the existing root model of 603, resulting in a tree as illustrated in tree 604.

In both trees 603 and 604, a subset of the stored sub-models, which are arranged in a chain, are being utilised to execute live-query data from execution environments, this subset being the active model chain. Noting, of course, that the processing of live query data may be executed by copies or other executable versions of the active model chain. Following initialisation, there may be only one sub-model acting as a root model (see, for example, active model chain 600). Later, the automated reconfiguration phases, will add sub-models as nodes to the model-tree, a process which may be referred to as boosting (see, for example, active model chain 602). At each instance of the automated reconfiguration phase, the apparatus will, in dependence upon the outcome of the comparison by the comparer 406, choose a sequence of sub-models from the sub-model database as an active model chain, or create (with the controller 408) and add a new sub-model to a branch of the existing active model chain.

Once the active model chain has been reconfigured, it is deployed 418 for processing real world query data from the execution environment 416. The deployment 420 of the active model chain is an executable version of the active model chain that processes real world query data from an execution environment 416 to generate output data, the output data being a classification, label, description, or some other representation of the real-world query data.

The real-world query data is exemplary of live query data. For example, the live query data may be image data, from which the tree-based learner extracts features and feature values. Alternatively, the live query data may be image data that is pre-processed before being input to the tree-based learner as input data, so that the input data is a vector of features and feature values.

An instance of real-word query data from a sensor, such as an image sensor, is sent from the execution environment 416 to the deployed active model chain 420 (deployed model). The deployed active model chain 420 processes the received image and recognizes, by way of example, that the slot A is mounted with board-type-2. However, it is against the pre-defined requirement (which can be a specimen data image, or a human input of the desired correct type of the board, or a variable storing the desired mounting config) that slot A should be mounted with board-type-1. In this case, since the deployed model has recognised an inconsistency, it may, for example, output a representation of the inconsistency, and/or a suggested solution, to an actor 422 in the execution environment.

Figure 7:
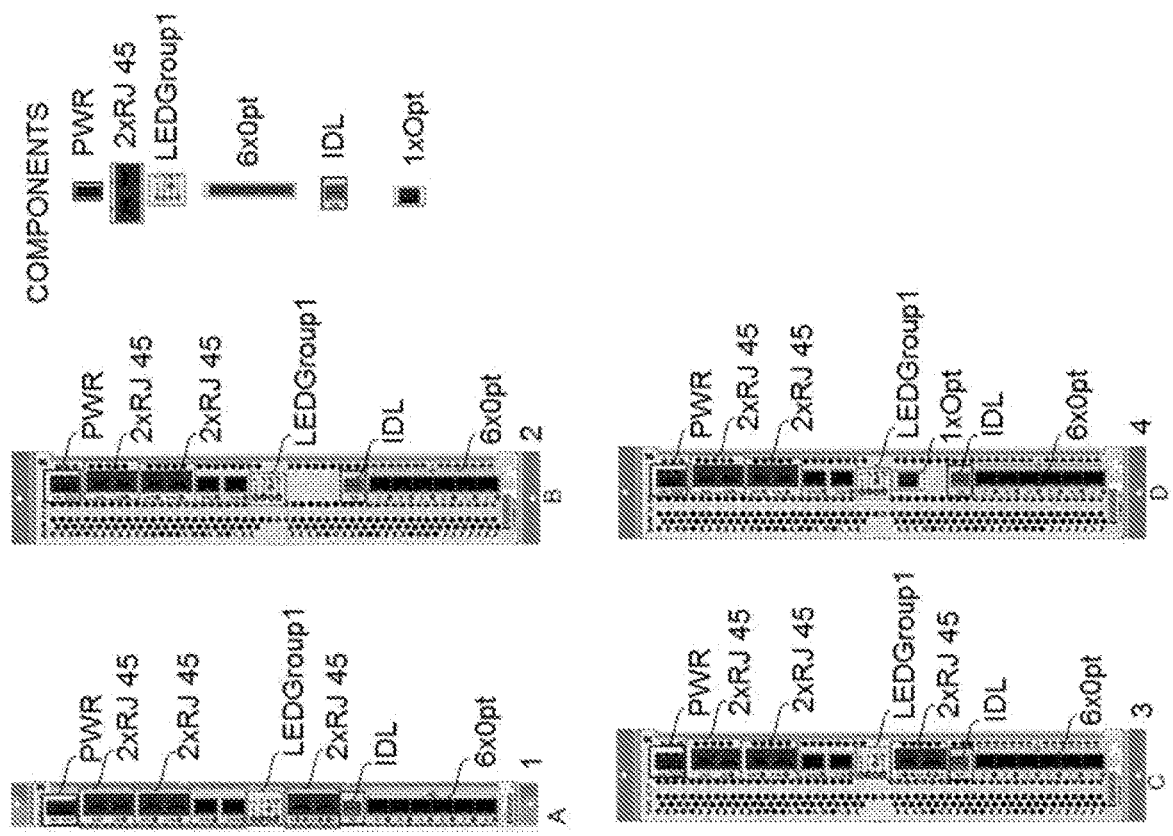
FIG. 7 illustrates exemplary specimen data.

FIG. 7 illustrates images of electronic devices, specifically base boards in racks, which demonstrate an implementation scenario of an embodiment. The process performed in the embodiment is represented schematically in FIG. 8.

The tree-based learner is configured to identify different electronic components, and in some implementations also faults with the components. The electronic components in question may be, for example, base band boards, such as those illustrated in FIG. 7, in which four different base band boards 701-704 are illustrated. Based on the identified base band board, an actor or operative can quickly access information relating, for example, to troubleshooting, fault correction, and/or order replacement parts. In implementations in which an error is identified, an actor or operative can use the identified error to find and implement a solution.

In the example of base band boards as the electronic component that the tree-based learner is configured to identify (i.e. classify images of base band boards according to model number), a common cause of malfunction is mismatched cables in the ports (slots) on the boards. The tree-based learner is configured to extract port information as features and feature values from images of the boards, and then based on the identity (feature) and number (feature value) of the ports, to identify the model of the base band board.

Optionally, implementations may be configured also to check whether the correct cables are inserted to the slots. If the cables are inserted in mismatched ports, then either a command is given to a robot, or instructions are given to a human actor or operative, to correct the placement of cables in ports. For example, either a special robot or an untrained human (not an expert field technician) can take out the cable from the wrong port and then insert it into the correct one.

Figure 8:
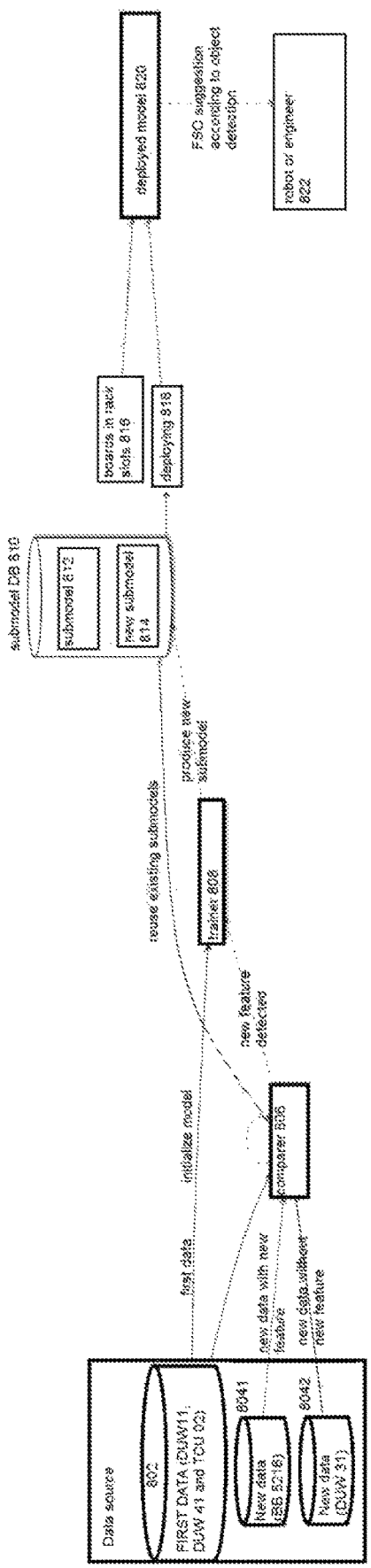
FIG. 8 illustrates an implementation example of an embodiment.

FIG. 8 illustrates an implementation example of an embodiment.

In a preprocessing stage, features are extracted from images of boards. In particular, the ports are extracted. The specimen data are images of boards, which, once received, may be processed by a feature extractor or object recognition algorithm such as a YOLO (you only look once) detector, or a Viola Jones (VJ) detector. The identified ports (e.g. identified by feature extraction using Yolo, VJ detector and etc) are provided as specimen data in an automated reconfiguration phase or initialisation phase, or as a version of live query data in a live execution phase (the initial version being the image data) to the active model chain, and the output is a prediction of board type. The implementation example of embodiments to board type prediction is illustrated in FIG. 8.

For this example, the process may be carried out at a user equipment (UE). That is, comparer 806, trainer 808, sub-model database 810, and executable active model chain reside at the UE. For other use cases, the executable active model chain (i.e. the live execution phase) is at the user equipment, whereas the comparer 806, trainer 808, and sub-model database 810 are executed at the edge or on a cloud-based server. The particular arrangement may be dependent upon the QoS requirements of the implementation.

In an initialisation phase, exemplary of S101 or S501, a first set of specimen data 802, exemplary of the first set of specimen data 402 from FIG. 4, and composed of instance A and instance C, is input to the trainer 808. The trainer 808 is exemplary of the trainer 408 of FIG. 4. It may be that the specimen data instance A and instance C are images of respective boards, from which images features and feature values are extracted by sub-models and used for classification by sub-models. Alternatively, it may be that instance A and instance C are feature vectors extracted from images in a pre-processing stage.

FIGS. 9A to 9D illustrate a particular implementation example for classifying images of the boards shown in FIG. 7, according to the process of FIG. 8. FIGS. 9A to 9D illustrate the evolution of the sub-models and the active model chain in more detail than is feasible in FIG. 8. The submodels are represented by the line graphs, which chart probability of being classified as a particular board type against a determinant variable. These are simple examples of sub-models generated by a trainer 808 using base learner logistic regression. The measurements (values in instances) are non-accurate and ensembled, so the values can be non-integers. The values may be extracted from images (i.e. the instances are images) in a preprocessing stage, or the values may be extracted by the sub-models themselves. Alternatively, the instances may be feature vectors (i.e. features and respective feature values).

Figure 9A:
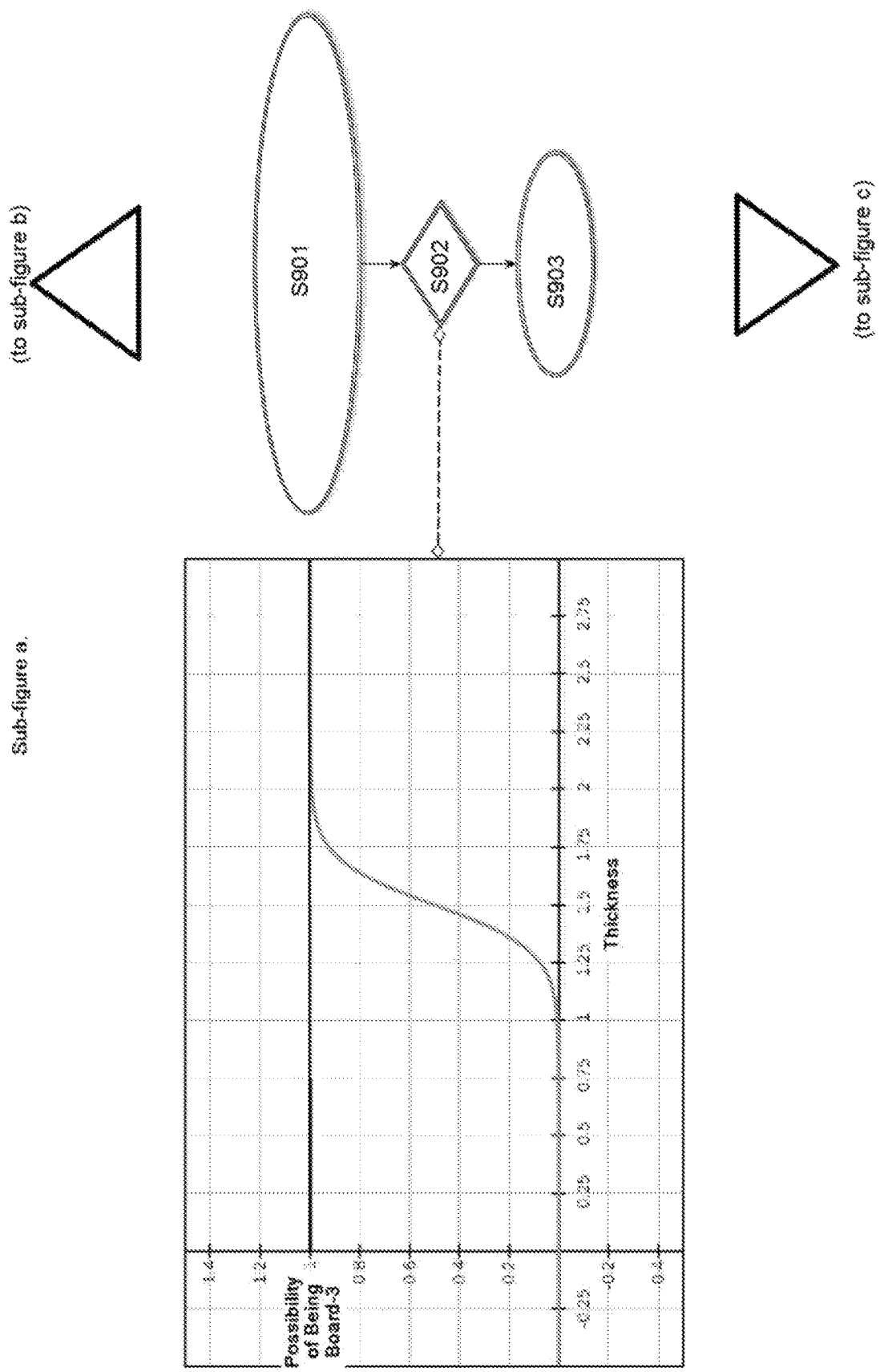
FIGS. 9A to 9D illustrate data processing by the sub-models.

The initialisation phase is further illustrated in FIG. 9A. Step S901 illustrates receipt of the first set of specimen data. Of the first set of specimen data, instance A has the following features and feature values: [thickness=1.1; PWR_nr=1; 2RJ45_nr=2.9]; and instance C: [thickness=2.1; PWR_nr=1; 2RJ45_nr=3.1]. The specimen data are labelled with classifications, wherein instance A is labelled as Board-type-1, and instance C is labelled as Board-type-3. At step S902, the trainer 808 trains a sub-model of a tree-based learner to classify input data (images or feature vectors) as either Board-type-1 or Board-type-3. As illustrated in FIG. 9A, thickness is the variable that determines whether to classify as board-type-1 or board-type-3.

For example, the sub-model is a hand-crafted-feature based cascade detector. Hand-craft-features of different port/part of the front plane are extracted and the sub-model is built and cascaded to form up a detector. Such a sub-model is trained in the trainer 408 with logistic regression. The sub-model is stored in the sub-model DB 810, which is exemplary of the sub-model DB 410. The sub-model is stored (currently as a root model) for future usage on live query data in an active model chain. Features include thickness, PWR_nr (total amount number of PWR ports), and 2RJ45_nr (total number of 2RJ45 ports). In the specimen data, thickness is a feature, which represents width of the board. The features are particular to the use case. Sub-models may be configurable feature extraction algorithms that extract features from images, and/or recognize objects in images. The trainer may use logistic regression to determine which extracted features are useful in distinguishing between instances of each specimen. In the implementation example of FIG. 8, thickness is selected by the trainer. Thickness is selected as the other two features are not useful in distinguishing between instances of Board-type-1 and instances of Board-type-3. Step S903 illustrates the prediction of board-type-1 for instance A and board-type-3 for instance C by the sub-model root_model_1.

Figure 9B:
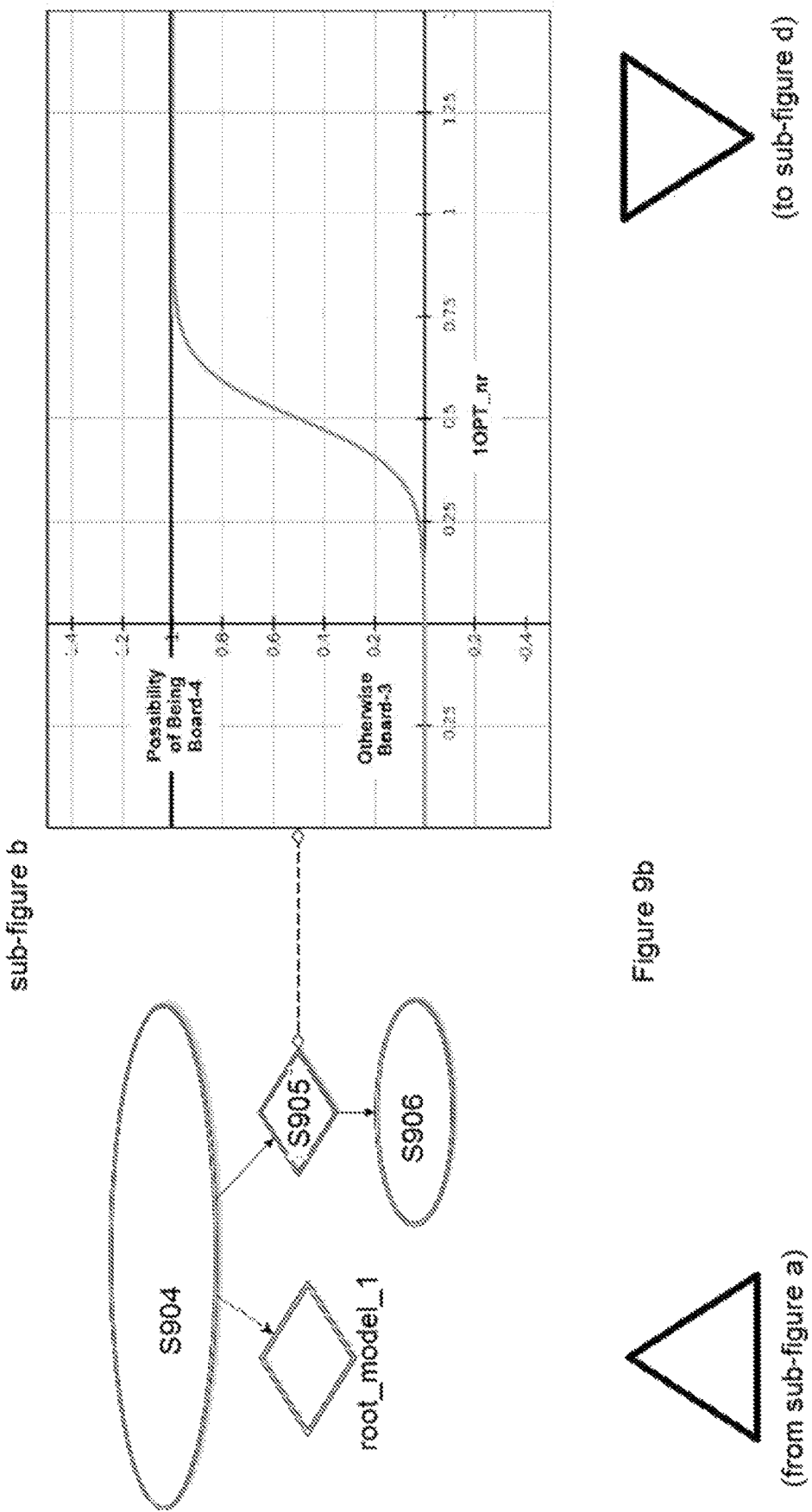
Figure 9C:
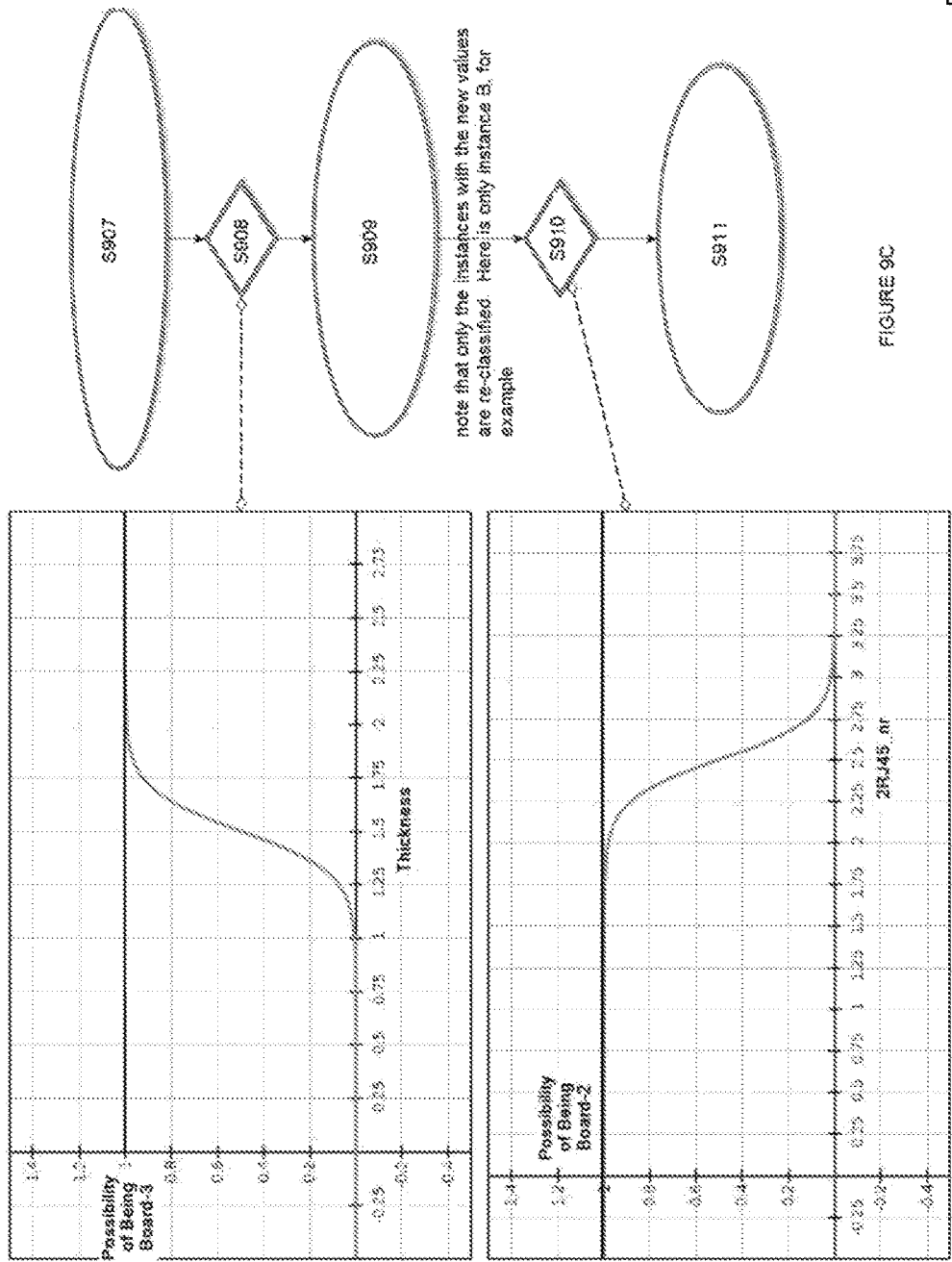

FIG. 9C shows an example of case 2 of FIG. 6A. A new product, board-type-2, comes into production, and at S907 a new set of specimen data 8042 is produced which includes the first set of specimen data 802 in addition to new specimen data representing the new product. The new set of specimen data 8042 is exemplary of the new set of specimen data 404 of FIG. 4.

The first set of specimen data 802 and the new set of specimen data 8042 are input to the comparer 806. The comparer 806 executes a clustering algorithm (either on each set individually and then compare results; or on both sets collectively). Features and feature values are extracted from the specimen data in a preprocessing stage (executed by the apparatus executing the process of FIG. 8). At step S908 the existing submodel is executed on the new specimen data, which includes one or more instances of board-type-2 that are wrongly classified as an instance of Board-type-3.

In the new set of specimen data 8042, instance A has the following features and feature values: [thickness=1.1; PWR_nr=1; 2RJ45_nr=2.9]; instance B: [thickness=1.9; PWR_nr=1; 2RJ45_nr=2.0]; and instance C: [thickness=2.1; PWR_nr=1; 2RJ45_nr=3.1]. In embodiments, the new set of specimen data is processed by (i.e. is input to) the active model chain (which at this stage in the implementation example is root_model_1), and the classification output by the active model chain is checked against the labelling of the specimen data by the comparer at S909. Any inconsistencies (i.e. instances of specimen data where the label does not match the output of the active model chain for the respective instance) are recorded by the comparer as mis-classified or wrongly classified.

In the implementation example, root_model_1, which had used thickness as a determinant variable in classifying instances as images of board-type-1 or board-type-3, classifies instance B as board-type-3. This is inconsistent with the labelling, since instance B is actually labelled as board-type-2.

The comparer 406 is aware that this classification is incorrect since instance B of the new specimen data is labelled as Board-type-2. However, either the sub-model, or the preprocessing algorithm (depending on where the feature extraction is happening in the implementation), does not extract any feature that is not present in the first set of specimen data. That is, all features of board-type-2 are already covered by the first set of specimen data (especially by board-type-3, as board-type-2 lacks one port of board-type-3) and the clustering result concludes specimen data images including images of Board-type-2 belong to a former cluster, Board-type-3. The comparer 806 can recognise from the labelling of the specimen data that the clustering is incorrect, and from the features and feature values that the features have not changed (though their values may have done). In this case, the feature values have changed, but not the features, so no new root model is required. Instead, a new sub-model is to be added to the active-model chain.

At S910, the trainer 808 is configured to boost a new sub-model (that is, to add a sub-model to the existing active model chain) from the wrongly identified instances to form a new detector by adding the newly trained sub-model to the current model-chain (following root-model-1). Logistic regression analysis performed by the trainer 808 identified 2RJ45_nr as the feature to be the dependent variable in the new sub-model.

In the active model chain, following classification by the root_model_1, instances having the new value (i.e. 2RJ45_nr=2) are re-classified by the newly-added new_sub_model, which recognises that 2RJ45_nr=2 has a high probability of being an instance of an image of board-type-2, and so classifies instance B as board-type-2. S911 illustrates the corrected classification of instance B by the new_sub_model trained in S910.

FIG. 9B shows an example of case 1 of FIG. 6A. A product is added to the population of objects/components of which images are to be classified by the tree-based learner. The new product contains an alien feature. A new sub-model (either sub-model or root-model depends on where the new instances are mis-identified) will be trained to fork the current active model chain. In the implementation example, a new root-model is trained and included in the detector. Suppose when the market and production plans change, board-type-1 is discontinued and totally abandoned, board-type-2 is on hold while still in market and in consideration, and board-type-4 is a new product type. In other words, for whatever reasons, the population or objects/components of which images are to be classified by the tree-based learner has changed, and this is reflected in new specimen data 8041 received at step S904. It is noted that implementations are possible wherein a population of objects/components only ever grows, so that if new specimen data is received by the apparatus, it is always submitted to the comparer as a new set that also incorporates the existing specimen data (i.e. the first set and any preceding new sets).

In the specific example of the implementation example at the stage of FIG. 9B, the population has evolved by the removal of some objects and the addition of new objects. The new set of specimen data 8041 comprises instance C, with the following features and feature values: [2RJ45_nr=3.1; 1OPT_nr=0.2]; and instance D: [2RJ45_nr=2.2; 1OPT_nr=0.9]. The comparer 806 recognises that the features have changed since the existing specimen data (which is set 8042 including instances A, B, & C).

Previously, "thickness" was used as a determinant variable, but now all boards in the population have the same thickness which makes thickness redundant. The comparer, for example by running a clustering algorithm, determines that a new feature is present in the new set of specimen data 8041 that enables to determine between instances of board-type-3 and instances of board-type-4. The new feature is "1OPT_nr", which is a number of a type of port. For example, an object recognition algorithm may extract the feature and feature values in a preprocessing stage executed on the specimen data. 2RJ45_nr is an alternative feature whose values enable a distinction to be made, though in the specific implementation example the logistic regression executed by the comparer 806 selects the 1OPT_nr. Since the feature is a new feature compared with the previous set of specimen data, the apparatus determines to develop a new root model according to the new set of specimen data with the trainer 808. Thus, at step S905, a new sub-model (1OPT_nr detector) is built by the trainer and added to the current model tree "root" to separate different product in an early stage. As illustrated at step S906, the new root_model_2 is trained to use values of the 1OPT_nr feature to distinguish between instances of board-type-3 and board-type-4.

Figure 9D:
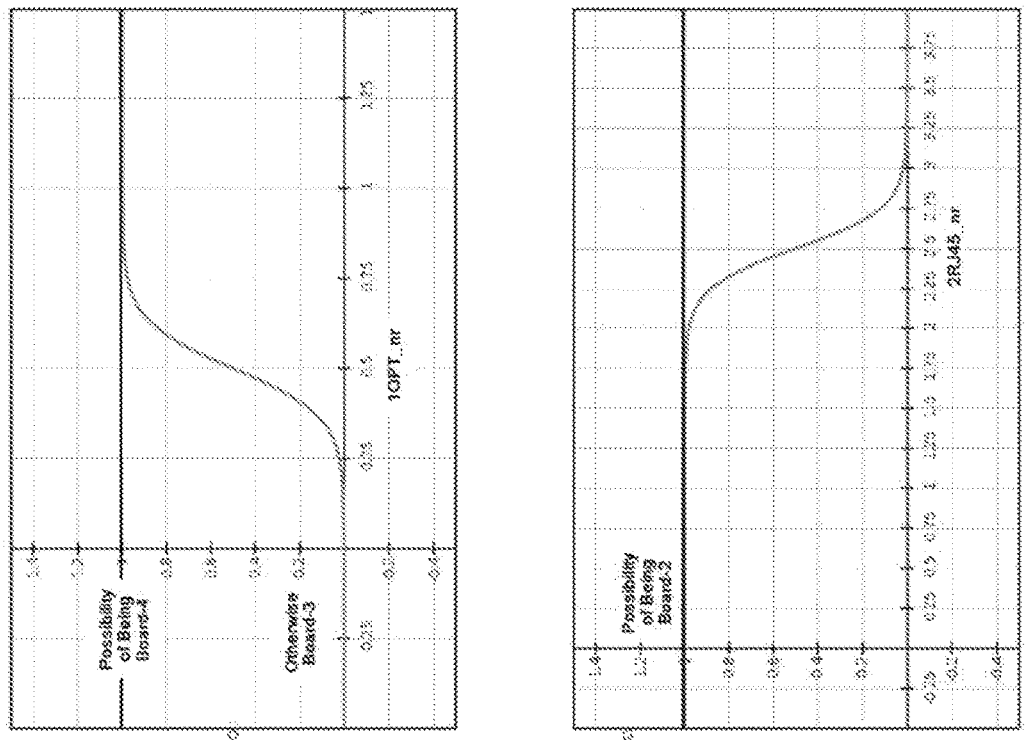
Figure 9D:
Figure 9D:
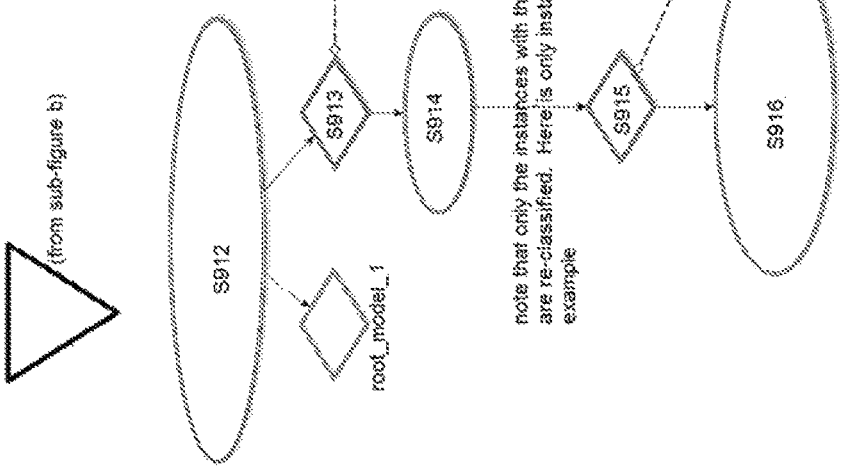

FIG. 9D illustrates the process followed by the apparatus in the case of a further new set of specimen data being received after the addition of root_model_2 to the active model chain in FIG. 9B. The population of objects/components of which images are to be classified by the tree-based learner has changed again, by the addition of instance B (for example, because board_type_2 is back in production or for some other reason is back in the population). At step S912, a new set of specimen data is received. The new set of specimen data comprises instance C, with the following features and feature values: [2RJ45_nr=3.1; 1OPT_nr=0.2]; instance D: [2RJ45_nr=2.2; 1OPT_nr=0.9]; and now instance_B: [2RJ45_nr=2.1; 1OPT_nr=0.1].

The new set of specimen data and the previous new set of specimen data 8041 are input to the comparer 806. The comparer 806 executes a clustering algorithm (either on each set individually and then compare results; or on both sets collectively). Features and feature values are extracted from the specimen data in a preprocessing stage (executed by the apparatus executing the process of FIG. 8). At step S913, the existing active model chain, comprising root_model_2, is executed on the new specimen data, which, as shown in S914, includes one or more instances of board-type-2 that are wrongly classified as an instance of Board-type-3 (based on the number of 1OPT ports being close to 0).

In the implementation example, root_model_2, which had used 1OPT_nr as a determinant variable in classifying instances as images of board-type-3 or board-type-4, classifies instance B as board-type-3. This is inconsistent with the labelling, since instance B is actually labelled as board-type-2 (labelling is a type of metadata associated with the respective instances of specimen data).

The comparer 406 is aware that this classification is incorrect since instance B of the new specimen data is labelled as Board-type-2. However, either the sub-model, or the preprocessing algorithm (depending on where the feature extraction is happening in the implementation), does not extract any feature that is not present in the previous new set of specimen data. That is, all features of board-type-2 are already covered by the new set of specimen data of FIG. 9B and the clustering result concludes specimen data images including images of Board-type-2 belong to a former cluster, Board-type-3. The comparer can recognise from the labelling of the specimen data that the clustering is incorrect, and from the features and feature values that the features have not changed (though their values may have done). In this case, the feature values have changed, but not the features, so no new root model is required. Instead, a new sub-model is to be added to the active-model chain.

At S915, the trainer 808 is configured to boost a new sub-model (that is, to add a sub-model to the existing active model chain) from the wrongly identified instances to form a new detector by adding the newly trained sub-model to the current model-chain (following root-model-2). Logistic regression analysis performed by the trainer 808 identified 2RJ45_nr as the feature to be the dependent variable in the new sub-model.

In the active model chain, following classification by the root_model_2, and as shown in step S916, instances having the new value (i.e. 2RJ45_nr=2) are re-classified by the newly-added new_sub_model, which recognises that 2RJ45_nr=2 has a high probability of being an instance of an image of board-type-2, and so classifies instance B as board-type-2.

An instance of real-word query data from a sensor, such as an image sensor, is sent from the execution environment 816 to the deployed active model chain 820 (deployed model). The deployed active model chain 820 processes the received image and recognizes, by way of example, that the slot A is mounted with board-type-2. However, it is against the pre-defined requirement (which can be a specimen data image, or a human input of the desired correct type of the board, or a variable storing the desired mounting config) that slot A should be mounted with board-type-1. In this case, since the deployed model has recognised an inconsistency, it may, for example, output a representation of the inconsistency, and/or a suggested solution, to an robot or engineer in the execution environment.

The invention claimed is:

1. A method for managing a tree-based learner, the method comprising
in an initialization phase:
training the tree-based learner with a first set of specimen data to process input data with an active model chain comprising at least a root model to generate an output, each member of the first set of specimen data having a value of each of a first set of features;
in an automated reconfiguration phase:
receiving a new set of specimen data, each member of the new set of specimen data having a value of each of a new set of features;
performing a comparison between the new set of specimen data and the first set of specimen data;
in response to the executed comparison indicating new values of a feature in the new set of specimen data, new values being values of the feature that are outside a range of, or otherwise different from, values of the said feature in the first set of specimen data, reconfiguring the tree-based learner by the addition of a new sub-model to the active model chain, the new sub-model being trained to process at least the new values of the feature.

2. A method according to claim 1, further comprising, in the automated reconfiguration phase:
responding to the performed comparison indicating a difference in membership of the first set of features and the new set of features, by reconfiguring the tree-based learner by building a new root model to replace a root model in the active model chain, including training the new root model with at least the new set of specimen data.

3. A method according to claim 1, wherein the addition of the new sub-model to the active model chain comprises:
determining whether one or more sub-models adapted to process the new values of the feature is present in a database of sub-models stored in association with the tree-based learner;
responding to the presence in the database of one or more sub-models adapted to process the new values of the feature by adding said one or more adapted sub-models to the active model chain of the tree-based learner as a new node or nodes;
responding to the absence in the database of a sub-model adapted to process the new values of the feature by training a new sub-model adapted to process the new values of the feature, using the new set of specimen data, and adding said trained sub-model to the active model chain of the tree-based learner as a new node.

4. A method according to claim 3, wherein determining whether a sub-model adapted to process the new values of the feature is present in the database of sub-models comprises:
performing an execution of each of a set of stored sub-models on each member of the new set of specimen data including the new values of the feature, the members of the new set of specimen data being labelled with a target active model chain output value; and,
for each member of the set of stored sub-models:
in response to a proportion of the executions of the stored sub-model that generates an output value matching the target active model chain output value of the respective member being above a threshold proportion, determining that the stored sub-model is adapted to process the new values of the feature, and adding the stored sub-model to the active model chain; and
in response to said proportion being below the threshold proportion, determining that the stored sub-model is not adapted to process the new values of the feature.

5. A method according to claim 4, further comprising, for each member of the set of stored sub-models:
  in response to a proportion of the executions of the stored sub-model generating an output value matching the target active model chain output value of the respective member of the new set of specimen data being above the threshold proportion and below unity:
  determining whether there is, among the set of stored sub-models, a sub-model adapted to process members of the new set of specimen data for which the output value generated by the sub-model added to the active model chain does not match the target active model chain output value;
  wherein, said determining includes:
  executing each of the set of stored sub-models on said members of the new set of specimen data for which the output value generated by the sub-model added to the active model chain does not match the target active model chain output value; and
  in response to any sub-model generating output values matching the target active model chain output values of more than a second threshold proportion of said members, determining that the sub-model is adapted to process said members, and adding said sub-model to the active model tree as a new node.

6. A method according to claim 1, wherein
  performing a comparison between the new set of specimen data and the first set of specimen data comprises one or both of a first process and a second process, in the first process:
  executing a clustering algorithm on the first set of specimen data;
  executing the clustering algorithm on the new set of specimen data; and
  comparing the results;
  and in the second process:
  executing a clustering algorithm on the first set of specimen data and the new set of specimen data; and
  comparing the results.

7. A method according to claim 1, wherein the tree-based learner is a decision tree or a regression tree.

8. Apparatus comprising:
  processor circuitry and memory circuitry, the memory circuitry storing processing instructions which, when executed by the processor circuitry, cause the apparatus to execute a process comprising:
  in an initialization phase:
  training the tree-based learner with a first set of specimen data to process input data with an active model chain comprising at least a root model to generate an output, each member of the first set of specimen data having a value of each of a first set of features;
  in an automated reconfiguration phase:
  receiving a new set of specimen data, each member of the new set of specimen data having a value of each of a new set of features;
  performing a comparison between the new set of specimen data and the first set of specimen data;
  in response to the executed comparison indicating new values of a feature in the new set of specimen data, new values being values of the feature that are outside a range of, or otherwise different from, values of the said feature in the first set of specimen data, reconfiguring the tree-based learner by the addition of a new sub-model to the active model chain, the new sub-model being trained to process at least the new values of the feature.

9. The apparatus according to claim 8, wherein the process further comprises, in the automated reconfiguration phase:
  responding to the performed comparison indicating a difference in membership of the first set of features and the new set of features, by reconfiguring the tree-based learner by building a new root model to replace a root model in the active model chain, including training the new root model with at least the new set of specimen data.

10. The apparatus according to claim 8, wherein the addition of the new sub-model to the active model chain comprises:
  determining whether one or more sub-models adapted to process the new values of the feature is present in a database of sub-models stored in association with the tree-based learner;
  responding to the presence in the database of one or more sub-models adapted to process the new values of the feature by adding said one or more adapted sub-models to the active model chain of the tree-based learner as a new node or nodes;
  responding to the absence in the database of a sub-model adapted to process the new values of the feature by training a new sub-model adapted to process the new values of the feature, using the new set of specimen data, and adding said trained sub-model to the active model chain of the tree-based learner as a new node.

11. The apparatus according to claim 10, wherein determining whether a sub-model adapted to process the new values of the feature is present in the database of sub-models comprises:
  performing an execution of each of a set of stored sub-models on each member of the new set of specimen data including the new values of the feature, the members of the new set of specimen data being labelled with a target active model chain output value; and,
  for each member of the set of stored sub-models:
  in response to a proportion of the executions of the stored sub-model that generates an output value matching the target active model chain output value of the respective member being above a threshold proportion, determining that the stored sub-model is adapted to process the new values of the feature, and adding the stored sub-model to the active model chain; and
  in response to said proportion being below the threshold proportion, determining that the stored sub-model is not adapted to process the new values of the feature.

12. The apparatus according to claim 11, wherein the process further comprises, for each member of the set of stored sub-models:
  in response to a proportion of the executions of the stored sub-model generating an output value matching the target active model chain output value of the respective member of the new set of specimen data being above the threshold proportion and below unity:
  determining whether there is, among the set of stored sub-models, a sub-model adapted to process members of the new set of specimen data for which the output value generated by the sub-model added to the active model chain does not match the target active model chain output value;
  wherein, said determining includes:
  executing each of the set of stored sub-models on said members of the new set of specimen data for which the output value generated by the sub-model added to the active model chain does not match the target active model chain output value; and in response to any sub-model generating output values matching the target active model chain output values of more than a second threshold proportion of said members, determining that the sub-model is adapted to process said members, and adding said sub-model to the active model tree as a new node.

13. The apparatus according to claim 8, wherein performing a comparison between the new set of specimen data and the first set of specimen data comprises one or both of a first process and a second process, in the first process:

executing a clustering algorithm on the first set of specimen data;

executing the clustering algorithm on the new set of specimen data; and comparing the results;

and in the second process:

executing a clustering algorithm on the first set of specimen data and the new set of specimen data; and comparing the results.

14. The apparatus according to claim 8, wherein the tree-based learner is a decision tree or a regression tree.

15. The apparatus according to claim 8, wherein the process further comprises, in the automated reconfiguration phase:

responding to the executed comparison indicating that the new set of features is the same as the first set of features, and the range of values for each of said same set of features is the same in the new set of specimen data and the first set of specimen data, by determining not to re-configure the tree-based learner at least until a further new set of specimen data is received.

16. The apparatus of claim 8, wherein the first set of specimen data and the new set of specimen data are sensor data output from a sensor and labelled with a corresponding target detector output;

the apparatus further comprising:

a device, the device comprising sensor circuitry, output circuitry, device processor circuitry and device memory circuitry, the device memory circuitry being configured to store an executable version of the active model chain, and processing instructions which, when executed by the device processor circuitry, cause the sensor circuitry to execute, in a live execution phase, one or more readings to obtain one or more instances of live query data, and to cause the device processor circuitry to process the or each instance of live query data with the active model chain to generate a prediction as an output, and to output, via the output circuitry, a version of the respective instance of live query data labelled with the respective prediction.

17. The apparatus according to claim 16, wherein the first set of specimen data and the new set of specimen data are images, the sensor being an imaging sensor, each image being labelled with one or more target detector outputs, each target detector output identifying a particular object from among a population of objects, which particular object is identifiable as an instance of the particular object in the image; and each instance of the live query data from the execution environment is an image, and the generated prediction with which to label the live query data is an identification of a particular object from among the population of objects, the particular object, or an instance thereof, determined by the active model chain of the tree-based learner to be identifiable in the live query data.

18. The apparatus according to claim 16, wherein the automated reconfiguration phase is performed on a plurality of occasions, wherein, for each occasion, the new set of specimen data includes one or more images in which an object is newly-added to the population of objects since the previous performance of the automated reconfiguration phase, or, in the case of the first performance of the automated reconfiguration phase, since the initialization phase; and on each occasion, following the automated reconfiguration phase, the new set of specimen data becomes the first set of specimen data for the next occasion.

19. The apparatus according to claim 16, wherein the processor circuitry and memory circuitry are components of a server, optionally wherein the server is an edge server or a core network server, the server executing the initiation phase and one or more instances of the automated reconfiguration phase; and wherein the sensor circuitry of the device is the imaging sensor.

20. The apparatus according to claim 16, wherein the first set of specimen data and the new set of specimen data are images of electronic devices labelled with an identifier of the respective electronic device as the corresponding target active model chain output value, the population of objects is a population of electronic device models;

the instances of live query data are images of unidentified electronic devices; and the generated prediction is an identification of the respective unidentified electronic device as an instance of a particular electronic device model from among the population of electronic device models.

* * * * *